Patented Dec. 13, 1932

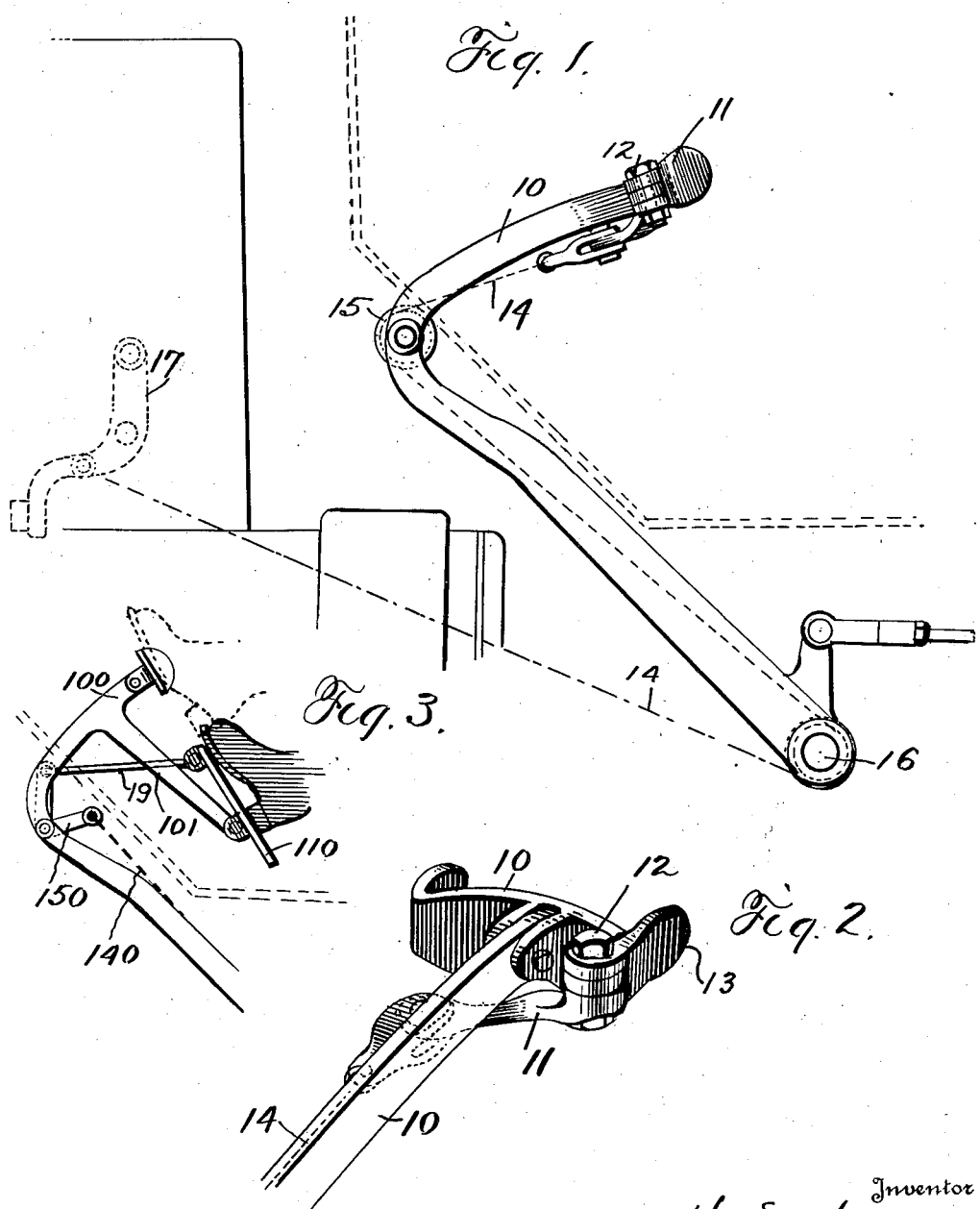

1,890,544

UNITED STATES PATENT OFFICE

HARRY E. HULL, OF WASHINGTON, DISTRICT OF COLUMBIA

MOTOR VEHICLE CONTROL

Application filed October 17, 1931. Serial No. 569,517.

My invention concerns devices for preventing an automobile driver accidentally operating the accelerator or supplying fuel to the motor at the time he applies the brake, this being a serious danger with the common or ordinary construction and relative positioning of accelerator and brake pedals. In my reissue Patent No. 17,520, I show and describe such a device and in the embodiment of the invention of that patent the accelerator pedal is mounted on the brake pedal or the two are connected so that when the brake pedal is moved, the accelerator pedal moves with it. This situation makes it important and indeed vital to prevent the accelerator pedal when it moves with the brake pedal opening the throttle or increasing the fuel supply. In the device of said patent, a certain amount of lost motion of the accelerator pedal is provided, for when the brake pedal is operated to apply the brake, so as to prevent the operation of the throttle. A particular object of my present invention is to enable the mounting of the accelerator pedal on the brake pedal and yet prevent any operation of the throttle when the brake pedal is moved to apply the brake. Mounting of the accelerator pedal on the brake pedal is very desirable with the invention of my above mentioned patent because the brake operating foot is the one used to operate the accelerator and the two must, therefore, be close together. Another object of my invention is to assure that in the act of applying the brakes, the accelerator will be automatically in a condition to cut off the supply of gas.

For the attainment of the objects mentioned and others which will be appreciated by those skilled in the art, my invention consists in whatever is described by or is included within the terms or scope of the appended claims.

In the drawing:—

Fig. 1 is a view partly in vertical section and partly in side elevation of enough of an automobile power plant and control mechanism to illustrate an embodiment of my invention;

Fig. 2 is a detail view in perspective of the brake and accelerator devices thereof;

Fig. 3 is a detail view in side elevation of part of the mechanism illustrating another embodiment of my invention.

In what I now regard as the most satisfactory embodiment of my invention, I place the brake pedal 10 (which as shown is of ordinary construction) and the accelerator pedal 11, along side one another with the brake pedal at the right of the driver so that the sole of the driver's right foot can bear or rest upon either. Preferably a different motion of the foot for actuating the accelerator to open the throttle is required from that motion for applying the brakes. For applying the brakes, the ordinary forward thrust of the foot on the brake pedal is used while a sidewise or lateral or tilting motion of the foot is required to actuation the accelerator pedal to open the throttle. Accordingly, a double safeguard against operation of the accelerator when the intention is to simply apply the brakes is afforded. One safeguard is the difference in the motions for the two acts and the other is that the normal or usual direction of movement of the foot for applying the brakes is without any effect or action whatever upon the accelerator pedal even though the accelerator pedal moves with the brake pedal.

In the embodiment of my invention shown in the drawing, the accelerator pedal, 11, has the form of a bell-crank lever having a pivot, 12, at the left side of the foot-engaging portion of the brake pedal 10 and with the foot-engaging arm or finger, 13 situated at the left of the brake pedal for engagement by the side of the foot by sidewise movement thereof. The other arm of the bell-crank lever has attached to it one end of a chain, 14, or other flexible power transmitting device that thence passes to and over a small guide pulley or roller, 15, mounted on pedal 10, to which the brake pedal is connected and from said pulley, 15, the chain 14, runs to and is connected with one arm of the throttle lever, 17. Thus passing about the rock shaft 16, the accelerator pedal connection has a center of motion substantially concentric with the center of motion of the brake pedal and thus motion of the brake pedal in applying the brakes does not result in any pull on the throttle lever, 17, that will affect the gas supply. There is no relative motion of the accelerator throttle operating devices and the brake lever when the brake lever is moved in a brake-applying operation.

Yet at all times there is a positive and direct connection between the accelerator pedal and the throttle and not a broken or interrupted power transmitting connection.

When the form of the brake pedal requires it, or renders it desirable, the chain, 14, from the accelerator pedal, 11, to the pulley, 15, may follow the outline or form in side view of the brake pedal as shown in the drawing by being carried over a roller or pulley, 18, intermediate the accelerator pedal 11, and the pulley 15.

Instead of locating the accelerator pedal at the side of the brake pedal, I contemplate placing it in a position in the same vertical plane as the brake pedal and with the two pedals in different horizontal planes with the accelerator pedal lower than the brake pedal. By this positioning of the two pedals and especially when the accelerator pedal is lower and somewhat to the rear of the brake pedal, the foot when resting on the accelerator pedal at the time a sudden or emergency stop of the car becomes necessary will by an involuntary or natural impulse, be shifted from the accelerator pedal to the brake pedal and thus danger of opening the throttle when the intention is to apply the brakes will be safeguarded against. Under such conditions, the leg naturally tends to thrust forward and to straighten under the impulse to stop the car and by the relative arrangement of the pedals described, I utilize that natural impulse. In Fig. 3 of the drawing I illustrate this relative arrangement of the pedals, the accelerator pedals 110, being pivoted to an arm, 101, of the brake pedal, 100. The connection from the accelerator pedal to the throttle includes a bell-crank lever 150, one arm of which is connected by a link rod 19, with the accelerator pedal and the other arm being connected by a chain, 140, which is carried to and around the brake pedal axis as in Fig. 1. Of course, my invention as far as the relative arrangement of the pedals is concerned as shown in Fig. 3 does not depend upon any particular connection between the accelerator pedal and the throttle or for that matter any connection with the brake pedal.

What I claim is:—

1. A control mechanism for automobiles comprising brake and accelerator pedals, the foot-engaging portion of the brake pedal being forward of the foot-engaging portion of the accelerator pedal in position for the shifting of the foot by forward movement from accelerator pedal to the brake pedal, said brake pedal having an arm with which the accelerator pedal is movably connected to permit independent movement of the accelerator pedal for throttle operation, said brake pedal arm extending rearward below the foot-engaging portion of the brake pedal and the accelerator pedal being pivoted thereto to rock for throttle operation.

2. A control mechanism for automobiles comprising a brake pedal mounted for swinging movement towards and from the front of the automobile, an accelerator pedal mounted for movement with the brake pedal and in the direction in which it moves and movable independently thereof, a throttle-actuating element forward of the brake pedal and means for transmitting movement of the accelerator pedal to the throttle-actuating element when it is operated independently of the brake pedal, that extends between the accelerator pedal and said throttle-actuating element, said power-transmitting means including a flexible member that has a portion concentric with the center of motion of the brake pedal and which is prolonged therefrom towards said brake pedal and towards said throttle actuating element, respectively the brake pedal having a movement about such center of motion when the brake pedal is swung to apply the brakes, and in the same direction in which the brake pedal moves.

3. A control mechanism for automobiles comprising brake and accelerator pedals, the foot-engaging portion of the brake pedal being forward of the foot-engaging portion of the accelerator pedal in position for the shifting of the foot by forward movement from accelerator pedal to the brake pedal, the two pedals being spaced apart a distance such that when the foot of the operator is on the brake pedal, it will be wholly forward of the accelerator pedal whereby the brake pedal may be operated to apply the brakes with the foot wholly forward of and out of contact with the accelerator pedal and the foot when on the accelerator pedal will be wholly in rear of and out of contact with the brake pedal, and the accelerator pedal being movably attached to and carried by the brake pedal.

4. A control mechanism for automobiles comprising brake and accelerator pedals, the foot-engaging portion of one pedal being forward of the foot-engaging portion of the other pedal in position for the shifting of the foot by forward movement from one pedal to the other pedal, the two pedals being spaced apart a distance such that when the foot of the operator is on the brake pedal, it will be wholly off and out of contact with the accelerator pedal, whereby the brake pedal may be operated to apply the brakes with the foot wholly out of contact with the accelerator pedal, and the foot when on the accelerator pedal will be wholly off and out of contact with the brake pedal, and the accelerator pedal being movably attached to and carried by the brake pedal.

In testimony whereof I hereunto affix my signature.

HARRY E. HULL.